(12) United States Patent
Medsker

(10) Patent No.: US 6,659,224 B2
(45) Date of Patent: Dec. 9, 2003

(54) ARTICULATING STEP ASSEMBLY

(75) Inventor: James A Medsker, Lawton, MI (US)

(73) Assignee: Elkhart Tool & Die, Elkhart, IN (US)

( * ) Notice: Subject to any disclaimer, the term of this patent is extended or adjusted under 35 U.S.C. 154(b) by 0 days.

(21) Appl. No.: 09/975,218

(22) Filed: Oct. 11, 2001

(65) Prior Publication Data

US 2003/0070875 A1 Apr. 17, 2003

(51) Int. Cl.$^7$ ................................................ E06C 5/00
(52) U.S. Cl. ........................ 182/91; 182/127; 182/88; 280/166
(58) Field of Search ............................. 182/127, 90–92, 182/88; 280/166, 163

(56) References Cited

U.S. PATENT DOCUMENTS

| | | | |
|---|---|---|---|
| 482,573 A | * | 9/1892 | Forester ................. 105/449 |
| 2,209,576 A | | 7/1940 | McDonald |
| 2,436,961 A | | 3/1948 | Gabriel |
| 2,627,831 A | * | 2/1953 | Robinson ................. 114/188 |
| 2,764,422 A | * | 9/1956 | McDonald ................. 105/447 |
| 2,852,271 A | | 9/1958 | McDonald |
| 3,515,406 A | | 6/1970 | Endsley |
| 3,645,557 A | | 2/1972 | Aldropp et al. |
| 3,807,758 A | | 4/1974 | Rogge |
| 3,833,240 A | | 9/1974 | Weiler |
| 3,876,230 A | | 4/1975 | Phillips |
| 3,955,827 A | * | 5/1976 | Wonigar .................. 105/445 |
| 3,997,211 A | | 12/1976 | Graves |
| 4,106,790 A | | 8/1978 | Weiler |
| 4,108,457 A | | 8/1978 | Garrett |
| 4,110,673 A | | 8/1978 | Nagy et al. |
| 4,116,457 A | | 9/1978 | Nerem et al. |
| 4,188,057 A | | 2/1980 | Pauli |
| 4,264,084 A | | 4/1981 | Telles |
| 4,275,664 A | | 6/1981 | Reddy |
| 4,424,751 A | | 1/1984 | Blochlinger |
| 4,570,962 A | | 2/1986 | Chavira |
| 4,606,790 A | | 8/1986 | Youngs et al. |
| 4,623,160 A | | 11/1986 | Trudell |
| 4,733,752 A | | 3/1988 | Sklar |
| 4,753,447 A | | 6/1988 | Hall |
| 4,982,974 A | | 1/1991 | Guidry |
| 5,028,063 A | | 7/1991 | Andrews |
| 5,076,547 A | | 12/1991 | Osterholm |
| 5,137,294 A | | 8/1992 | Martin |
| 5,154,125 A | | 10/1992 | Renner et al. |
| 5,199,731 A | | 4/1993 | Martin |
| 5,228,707 A | | 7/1993 | Yoder |
| 5,375,864 A | | 12/1994 | McDaniel |
| 5,397,143 A | | 3/1995 | Bird |
| 5,498,012 A | | 3/1996 | McDaniel et al. |
| 5,505,476 A | * | 4/1996 | Maccabee ................. 280/163 |
| 5,538,269 A | | 7/1996 | McDaniel et al. |
| 5,547,040 A | | 8/1996 | Hanser et al. |
| 5,584,493 A | | 12/1996 | Demski et al. |
| 5,738,362 A | | 4/1998 | Ludwick |
| 5,803,475 A | | 9/1998 | Dick |
| 5,806,869 A | | 9/1998 | Richards |
| 5,842,709 A | | 12/1998 | Maccabee |
| 5,957,237 A | * | 9/1999 | Tigner .................... 182/127 |
| 6,082,751 A | | 7/2000 | Hanes et al. |

FOREIGN PATENT DOCUMENTS

| | | |
|---|---|---|
| EP | 0 217 467 A1 | 9/1986 |
| FR | 2 670 445 A1 | 9/1990 |
| JP | 4-342629 | 11/1992 |
| JP | 5-310081 | 11/1993 |

* cited by examiner

*Primary Examiner*—Alvin Chin-Shue

(57) ABSTRACT

An articulating step assembly comprising: a side member which includes a guide slot having a first end and a second end; a drop linkage, wherein a portion of the drop linkage is slidably positioned within the guide slot; a pivot linkage, wherein the pivot linkage includes a first end and a second end, and wherein the first end of the pivot linkage is pivotally coupled to the side member and the second end of the pivot linkage is pivotally coupled to the drop linkage; and a step associated with the drop linkage, whereupon articulation of the step from a retracted position to an extended position slidably displaces the portion of the drop linkage positioned within the guide slot from the first end toward the second end thereof and pivots the pivot linkage relative to each of the side member and the drop linkage.

21 Claims, 4 Drawing Sheets

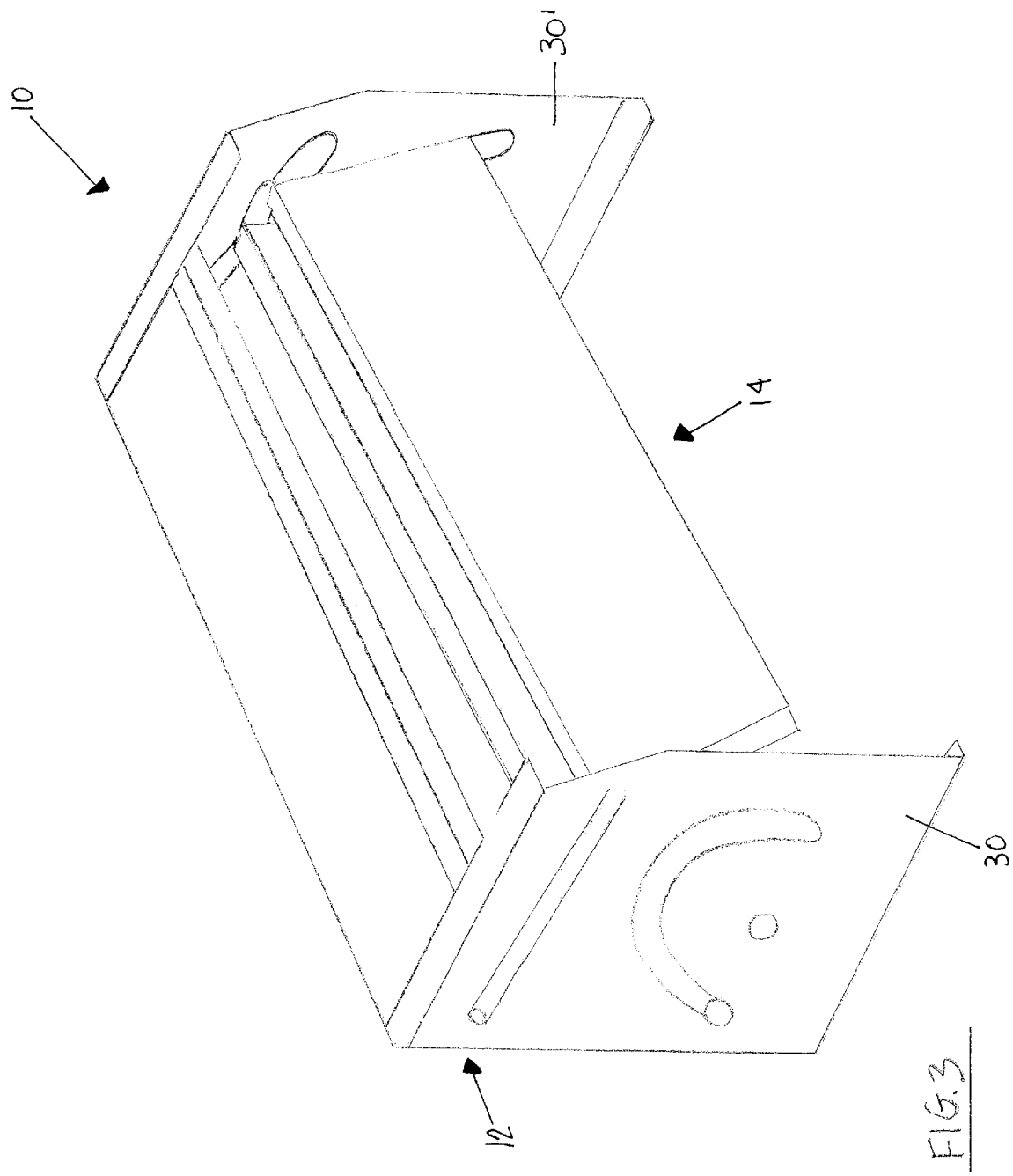

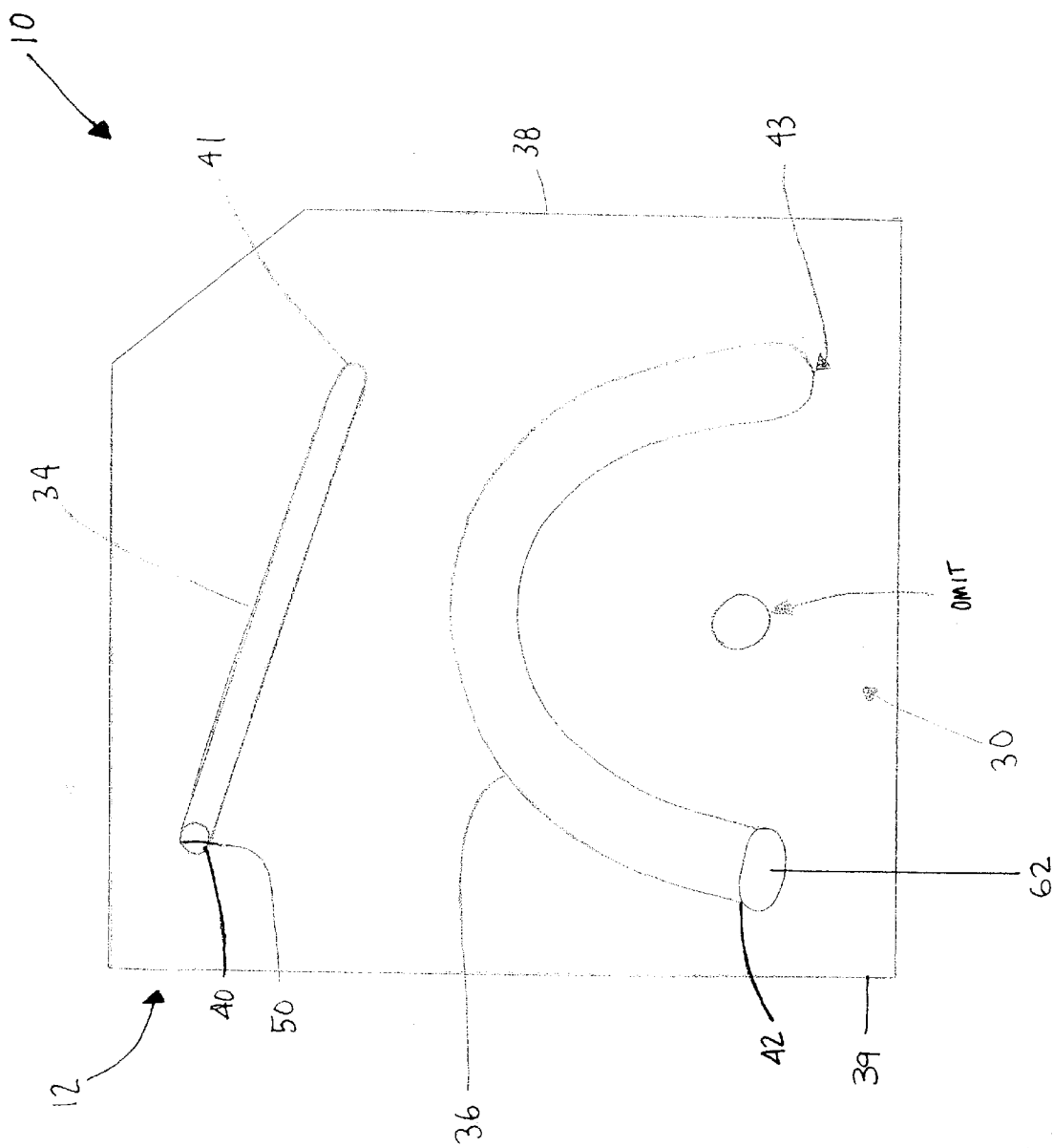

ARTICULATING STEP ASSEMBLY

BACKGROUND OF THE INVENTION

1. Field of the Invention

The present invention relates in general to an articulating step assembly for the ingress to and egress from, for example, a recreational vehicle, and more particularly, to a retractable and extendable step assembly for use with a recreational vehicle.

2. Background Art

Recreational vehicles, such as, for example, motorized vehicles or travel trailers, have been known in the art for several years. As technology has evolved, such recreational vehicles have become larger, taller, and more spacious, providing many of the comforts of home away from home. However, many of today's recreational vehicles include a large ground clearance or open space between the entrances of these vehicles and the ground. The large ground clearances have made it problematic for many to enter into or depart from such recreational vehicles.

In response to the problems associated with the ingress to and egress from a recreational vehicle, a number of retractable vehicle steps have become commercially available. Many of these retractable steps allow for an intermediate level between the ground and the door of the vehicle that can be retracted into or under the vehicle during storage and/or while the vehicle is in motion. While retractable vehicle steps have become commercially available, their configurations remain largely problematic such that they do not appear to fit within the standard envelope or side frames. Furthermore, such vehicle steps appear to require substantial effort to retract and extend and do not appear to provide substantial riser spacing when fully extended.

It is therefore an object of the present invention to provide an articulating step assembly for providing ingress to and egress from a vehicle that is relatively structurally simple, acceptably sturdy, and inexpensive to build, while the configuration of the articulating step fits within the standard envelope or side frames.

It is therefore a further object of the present invention to provide an articulating step assembly that is capable of providing multiple intermediate step levels which are easily retracted and extended and provide substantial riser spacing so that easy and reliable access to a vehicle is possible.

These and other objectives will become apparent in light of the present specification, claims, and drawings.

SUMMARY OF THE INVENTION

The present invention is directed to an articulating step assembly comprising: (a) a side member, wherein the side member is mountable to the undercarriage of a vehicle, and wherein the side member includes a guide slot having a first end and a second end; (b) a drop linkage, wherein a portion of the drop linkage is slidably positioned within the guide slot; (c) a pivot linkage, wherein the pivot linkage includes a first end and a second end, and wherein the first end of the pivot linkage is pivotally coupled to the side member and the second end of the pivot linkage is pivotally coupled to the drop linkage; and (d) a step associated with the drop linkage, whereupon articulation of the step from a retracted position to an extended position slidably displaces the portion of the drop linkage positioned within the guide slot from the first end toward the second end thereof and pivots the pivot linkage relative to each of the side member and the drop linkage.

In a preferred embodiment of the present invention the guide slot slopes downward from the first end to the second end.

In another preferred embodiment of the present invention, the portion of the drop linkage slidably positioned within the guide slot comprises a pin member.

In yet another preferred embodiment of the present invention, the side member further includes a base slot having a first end and a second end.

Preferably, the articulating step assembly of the present invention further includes: (a) an extension step, wherein the extension step is pivotally coupled to the drop linkage; and (b) an extension linkage, wherein the extension linkage includes a first end and a second end, and wherein the first end of the extension linkage is slidably positioned within the base slot, and the second end of the extension linkage is pivotally coupled to the extension step, whereupon articulation of the step from a retracted position to an extended position slidably directs the first end of the extension linkage from the first end of the base slot toward the second end of the base slot, thereby pivoting the second end of extension linkage relative to the extension step. In this embodiment the base slot is preferably non-linear and/or arcuate.

In a preferred embodiment of the present invention, the articulating step assembly further comprises an expansion sub-assembly, wherein the expansion sub-assembly includes a bracket and an expansion step, and wherein the bracket is pivotally coupled to the extension step.

The present invention is also directed to an articulating step assembly comprising: (a) a pair of side members spaced apart from one another, wherein the side members are mountable to the undercarriage of a vehicle, and wherein each side member includes a guide slot having a first end and second end; (b) a drop linkage associated with each side member, wherein a portion of each drop linkage is slidably positioned within the guide slot of the respective side member; (c) a pivot linkage associated with each side member, wherein each pivot linkage includes a first end and a second end, and wherein the first end of each pivot linkage is pivotally coupled to the respective side member and the second end of each pivot linkage is pivotally coupled to the respective drop linkage; and (d) a step positioned between the pair of side members, whereupon articulation of the step from a retracted position to an extended position slidably displaces the portion of each drop linkage positioned within the respective guide slot from the first end toward the second end thereof and pivots each pivot linkage relative to each respective side member and drop linkage.

The present invention is further directed to an articulating step assembly comprising: (a) a pair of side members spaced apart from one other, wherein the side members are mountable onto the undercarriage of a vehicle, and wherein each side member includes a guide slot and a base slot; and (b) a step assembly comprising a step, wherein the step assembly is associated with both of the guide slots and base slots, and wherein the base slots are substantially non-linear to, in turn, preclude inadvertent extension and/or retraction of the articulating step assembly.

BRIEF DESCRIPTION OF THE DRAWINGS

The invention will now be described with reference to the drawings wherein:

FIG. 3 of the drawings is a perspective schematic representation of an articulating step assembly shown in a retracted position; and FIG. 4 of the drawings is a side schematic representation of an articulating step assembly shown in a retracted position.

DETAILED DESCRIPTION OF THE INVENTION

Figure 1:
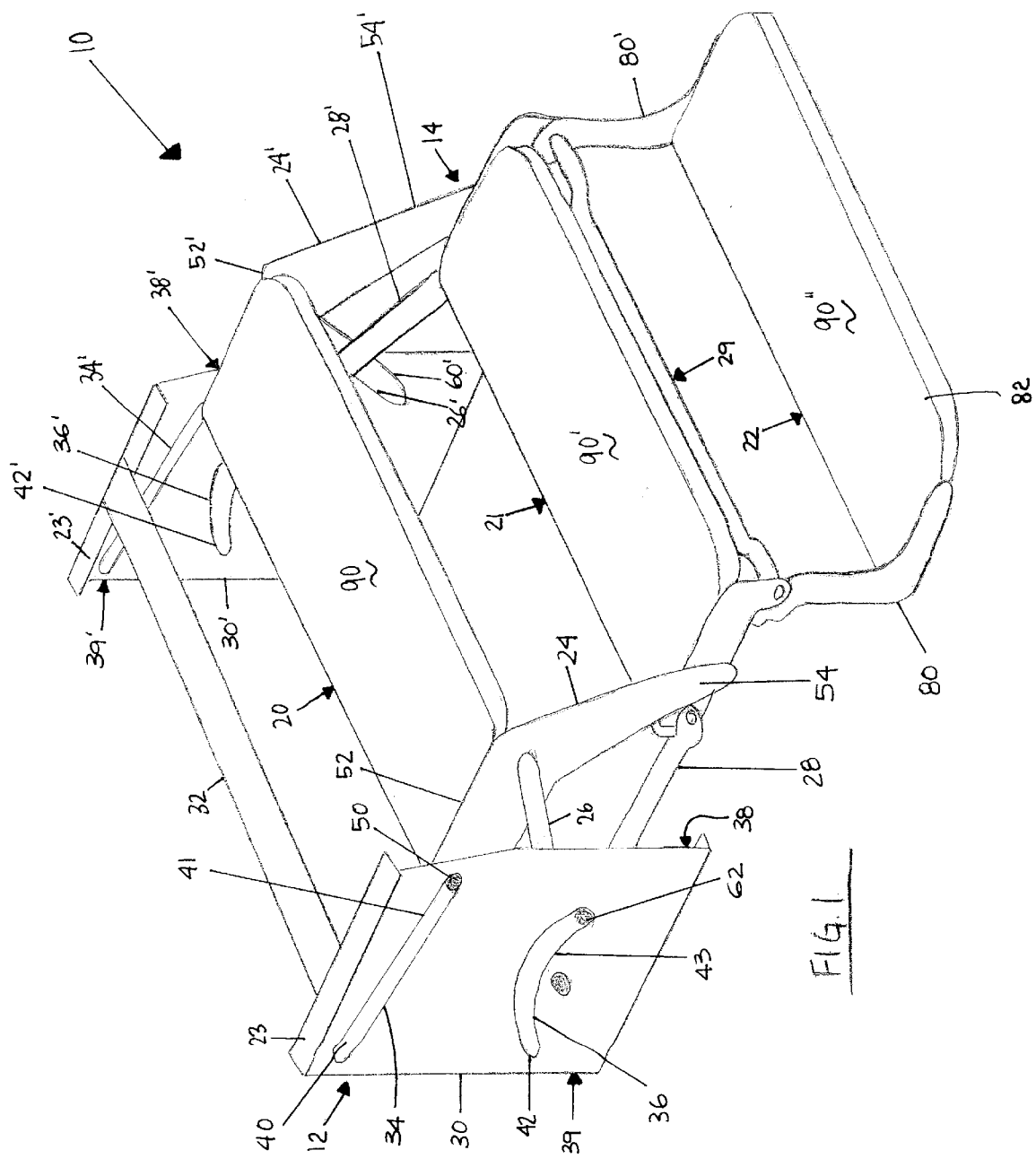
FIG. 1 of the drawings is a perspective schematic representation of an articulating step assembly shown in an extended position.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Referring now to the drawings and to FIG. 1 in particular, a first embodiment of articulating step assembly 10 is shown, which generally comprises frame assembly 12 and step assembly 14. It will be understood that FIGS. 1–4 are schematic representations of an articulating step assembly. As such, some of the components have been distorted from their actual scale for pictorial clarity. Articulating step assembly 10 is preferably used with recreational vehicles, such as recreational vehicles, but it will be understood that its use is not limited thereto. Indeed, most applicable vehicles have a door or other means of ingress/egress, and this door is normally spaced apart a certain distance from the ground. Therefore, the articulating step assembly is preferably associated with the area of the vehicle at which ingress/egress may take place.

As will be explained in detail below, step assembly 14, which preferably includes guide step 20, extension step 21, and expansion assembly 22, can be articulated from a retracted position (see FIGS. 3 and 4) to an extended position (see FIGS. 1 and 2). In the retracted position, step assembly 14, which generally includes guide step 20, extension step 21, and expansion assembly 22, is substantially housed within the confines of frame assembly 12. In the extended position, guide step 20 is positioned outwardly and downwardly relative to its retracted position, and extension step 21 and expansion assembly 22 are located below and outward from, and, in the embodiment shown, substantially parallel to step 20. In this position, ingress to and egress from a vehicle having a relatively large ground clearance can be facilitated with relative ease.

Referring once again to FIG. 1, frame assembly 12 generally comprises two side members 30 and 30', as well as frame brace 32. Side members 30 and 30' each comprise a substantially rigid planar piece of material having a front region 38 and a back region 39. Side members 30 and 30' additionally comprise at least one mounting bracket 23 and 23', which allow side members 30 and 30', respectively, to be fixedly attached to the underside of a vehicle (not shown) by, for example, bolts, fasteners, welding—just to name a few. Side members 30 and 30' are mounted in a spaced position relative to one another to the underside of a vehicle, and preferably are mounted substantially parallel to one another. In order to further ensure stability of articulating step assembly 10, frame brace 32 couples side members 30 and 30' to help ensure that the spacing and relative positioning of side members 30 and 30' will be properly maintained. Side members 30 and 30' and frame brace 32 are preferably constructed from, for example, metals, metal alloys, plastics, natural and synthetic resins.

Inasmuch as side members 30 and 30' are substantially identical, side member 30 will be discussed with the understanding that it is substantially identical to side member 30'. To that end, similar structures will be identified using the same reference numeral augmented by a prime ('). However, it will be understood that in certain embodiments, it is contemplated that one of the side members may be different than the other side member, as long as the desired motion can be achieved under, at least partial, direction of one of the side members.

Figure 2:
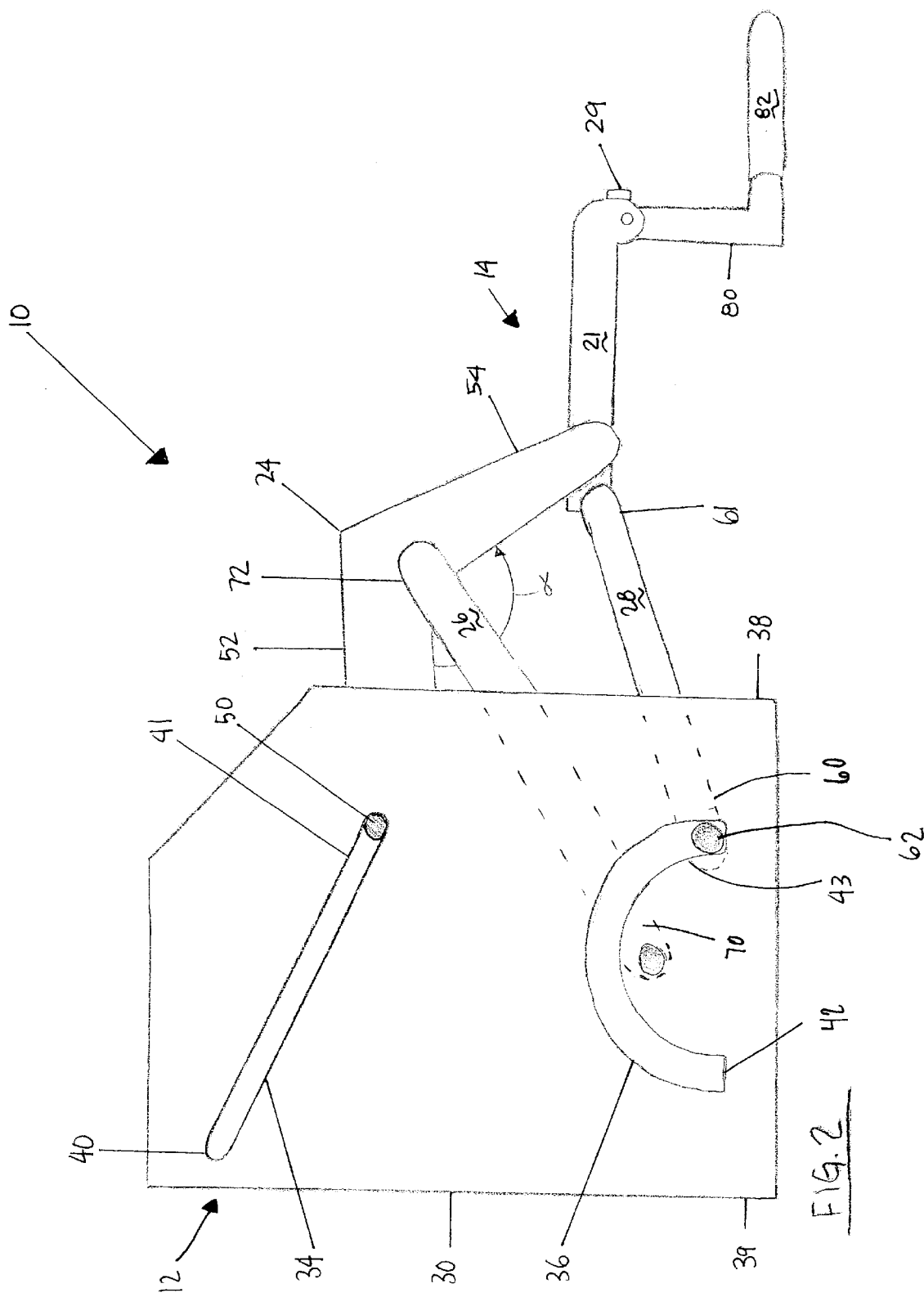
FIG. 2 of the drawings is a side schematic representation of an articulating step assembly shown in an extended position.

Specifically, and as is best shown in FIGS. 2 and 4, side member 30 includes guide slot 34 and base slot 36. Guide slot 34 includes first end 40 proximate back region 39 of side member 30, and second end 41 proximate front region 38 of side member 30. Guide slot 34 comprises a substantially linear slot, which slopes in a generally downward direction from back region 39 to front region 38 of side member 30. As such, first end 40 of the guide slot 34 is closer to the upper end of side member 30 than second end 41 of guide slot 34.

Base slot 36 includes first end 42 proximate back region 39 of side member 30 and second end 43 proximate front region 38 of side member 30. Base slot 36 comprises an arcuate or arch-like slot, having its low points near first end 42 and second end 43 thereof, and a high point therebetween. While a preferred arcuate configuration has been shown, for illustrative purposes only, it will be understood that other non-linear configurations that would be known to those having ordinary skill in the art having the present disclosure before them are likewise contemplated for use.

Referring again to FIG. 1, step assembly 14 comprises three mirrored pairs of individual linkages, including drop linkages 24 and 24', pivot linkages 26 and 26', and extension linkages 28 and 28' as well as handle 29. In order to more clearly describe the present invention, step assembly 14 will be described relative to a single side of the linkages, with the understanding that it is substantially identical to the other side of linkages. Accordingly, similar structures will utilize the same reference numerals augmented with a prime (').

Referring now to FIG. 2, drop linkage 24 comprises pin member 50 and an inverted L-shape member having an upper end 52 and lower end 54 with a substantially obtuse angle ($\alpha$). Drop linkage 24 provides a support structure for guide step 20, which is fixedly associated between the mirrored pair of drop linkages 24 and 24'. While it is contemplated that guide step 20 may be associated at any point along drop linkage 24, in the embodiment shown in FIG. 1, step 20 is positioned along upper end 52 of drop linkage 24. In order to be able to support step 20 appropriately, drop linkage 24 is preferably constructed from any one of a number of rigid materials, including metals, metal alloys, plastics, natural and synthetic resins—just to name a few.

Pin member 50 is associated with upper end 52 of drop linkage 24. Pin member 50 is positioned so as to slidably couple with guide slot 34 of side member 30 so that guide slot 34 directs the movement of pin member 50, and in turn, step assembly 14. Pin member 50 may additionally include any one of a number of means for increasing slidability, including, for example, a lubricant or coating.

As is best shown in FIG. 2, pivot linkage 26 comprises a substantially linear linkage, which includes first end 70 and second end 72. First end 70 is pivotably coupled to side member 30, and second end 72 is pivotably coupled to drop linkage 24. This connection enables pivot linkage 26 to provide both guidance relative to the movement of step assembly 14 and support for the same in both retracted and extended positions.

Extension linkage 28 includes first end 60, second end 61, and pin member 62. Pin member 62 is positioned on first end 60 of extension linkage 28 and is associated with base slot 36, wherein pin member 62 provides a sliding connection between extension linkage 28 and base slot 36. Similar to pin member 50 of drop linkage 24, pin member 62 of extension linkage 28 may additionally comprise a means for increasing slidability, such as a lubricant and/or coating. Extension linkage 28 is pivotally connected with extension step 21 at the second end, enabling extension step 21 to move from a substantially vertical position when step assembly 14 is in a retracted position, as is shown in FIG. 3, to a substantially horizontal position when step assembly 14 is in an extended position, as is shown in FIGS. 1 and 2. In order to further facilitate this movement, extension step 21 is also pivotably associated with drop linkage 24.

Expansion assembly 22 is shown in FIG. 1, as comprising a pair of L-shaped brackets 80 and 80', and expansion step 82 fixedly positioned therebetween. As is shown in FIG. 2, L-shaped bracket 80 is rotatably associated with extension step 21, which allows expansion step 82 to be folded inwardly toward extension step 21, such that the stepping surfaces of extension step 21 and expansion step 82 face one another.

Referring back again to FIG. 1, guide step 20, extension step 21, and expansion step 82 of expansion assembly 22, generally comprise an elongated flat surface having a substantially rectangular configuration. The steps additionally comprise stepping surfaces 90, 90', and 90" respectively, upon which a means for increasing traction may be associated. For example, a means for increasing traction may comprise applying a gripping surface, such as a slotted plastic mat. Alternatively, the means for increasing traction may comprise a multitude of holes emanating through the stepping surface and the steps themselves. The means for increasing traction is intended to provide a safe and reliable surface for a person to walk on when articulating step assembly 10 is in an extended position.

Referring once again to FIGS. 1 and 2, handle 29 of step assembly 14 may be associated in any one of number of locations, but it is preferably associated with the underside of extension step 21. Handle 29 provides a means for manually articulating the step assembly from the retracted position shown in FIGS. 3 and 4 to the extended position shown in FIGS. 1 and 2. For purposes of the present invention, handle 29 is preferably fabricated from one or more metals, metal alloys, plastics, natural and synthetic resins—just to name a few.

In operation, articulating step assembly 10 generally begins in a stored, retracted position, with step assembly 14 substantially contained within the confines of frame assembly 12. Upon articulation of handle 29, in a generally downward and outward manner relative to frame assembly 12, drop linkages 24 and 24' of step assembly 14 begin to slide along their respective guide slots (i.e., from at or near the first end of the guide slot toward the second end of guide slot). Concurrently, the pivot linkages 26 and 26' begin to pivot. Specifically, pivot linkages 26 and 26' begin to pivot relative to their respective side members and drop linkages, thereby keeping the second ends of the pivot linkages moving in an arcuate manner. The arcuate displacement pivots guide step 20 away from horizontal, and slightly elevates drop linkages 24 and 24' in transition, extending step assembly 14 out and away from frame assembly 12. As step assembly 14 is extended outward, first ends 60 and 60' of extension linkage 28 and 28', respectively, begin to move from at or near first ends 42 and 42' of base slots 36 and 36' toward second ends 43 and 43' of their respective base slot. As first ends 60 and 60' of extension linkage 28 and 28' are slidably repositioned within their respective base slot, second ends 61 and 61' pivot relative to extension step 21, causing extension step 21 to rotate from a substantially vertical position forward towards a substantially horizontal position.

Once extension step 21 is positioned in a substantially horizontal position, and step assembly 14 is substantially extended, expansion sub-assembly 22 may be rotated relative to extension step 21. During rotation, expansion step 82 of expansion sub-assembly 22 is rotated from a substantial facial relation with extension step 21 to a substantially parallel and horizontal position to extension step 21. In the final, extended position, each one of guide step 20, extension step 21 and expansion step 82 are in a substantially horizontal position, with extension step 21 and expansion step 82 in a progressively staggered positions relative to step 20.

The reversing of these steps will return the assembly to the underplayed position. It will be understood that because the base slots include a region that is elevated to each of the first end and second end, the shape of the base slot precludes inadvertent deployment of the assembly, during, for example, travel over rough terrain.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. An articulating step assembly, comprising:
    a side member, wherein the side member is mountable to the undercarriage of a vehicle, and wherein the side member includes a guide slot having a first end and a second end;
    a drop linkage comprising an inverted L-shaped member, wherein a portion of the drop linkage is slidably positioned within the guide slot;
    a pivot linkage, wherein the pivot linkage includes a first end and a second end, and wherein the first end of the pivot linkage is pivotally coupled to the side member and the second end of the pivot linkage is pivotally coupled to the drop linkage; and
    a step associated with the drop linkage, whereupon articulation of the step from a refracted position to an extended position slidably displaces the portion of the drop linkage positioned within the guide slot from the first end toward the second end thereof and pivots the pivot linkage relative to each of the side member and the drop linkage.

2. The articulating step assembly according to claim 1, wherein the guide slot slopes downward from the first end to the second end.

3. The articulating step assembly according to claim 1, wherein the portion of the drop linkage slidably positioned within the guide slot comprises a pin member.

4. The articulating step assembly according to claim 1, wherein the side member further includes a base slot having a first end and a second end.

5. The articulating step assembly according to claim 4, further comprising:
    an extension step, wherein the extension step is pivotally coupled to the drop linkage; and
    an extension linkage, wherein the extension linkage includes a first end and a second end, and wherein the first end of the extension linkage is slidably positioned within the base slot, and the second end of the extension linkage is pivotally coupled to the extension step, whereupon articulation of the step from a retracted position to an extended position slidably directs the first end of the extension linkage from the first end of the base slot toward the second end of the base slot, thereby pivoting the second end of extension linkage relative to the extension step.

6. The articulating step assembly according to claim 4, wherein the base slot is non-linear.

7. The articulating step assembly according to claim 6, wherein the base slot is arcuate.

8. The articulating step assembly according to claim 7, further comprising:
an extension step, wherein the extension step is pivotally coupled to the drop linkage; and
an extension linkage, wherein the extension linkage includes a first end and a second end, and wherein the first end of the extension linkage is slidably positioned within the base slot, and the second end of the extension linkage is pivotally coupled to the extension step, whereupon articulation of the step from a retracted position to an extended position slidably directs the first end of the extension linkage from the first end of the base slot toward the second end of the base slot, thereby pivoting the second end of extension linkage relative to the extension step.

9. The articulating step assembly according to claim 4, further comprising an expansion sub-assembly, wherein the expansion sub-assembly includes a bracket and an expansion step, and wherein the bracket is pivotally coupled to the extension step.

10. The articulating step assembly according to claim 9, wherein the first end of the extension linkage slidably positioned within the base slot comprises a pin member.

11. An articulating step assembly, comprising:
a pair of side members spaced apart from one another, wherein the side members are mountable to the undercarriage of a vehicle, and wherein each side member includes a guide slot having a first end and second end;
a drop linkage associated with each side member, wherein a portion of each drop linkage is slidably positioned within the guide slot of the respective side member and wherein each drop linkage comprises an inverted L-shaped member;
a pivot linkage associated with each side member, wherein each pivot linkage includes a first end and a second end, and wherein the first end of each pivot linkage is pivotally coupled to the respective side member and the second end of each pivot linkage is pivotally coupled to the respective drop linkage; and
a step positioned between the pair of side members, whereupon articulation of the step from a retracted position to an extended position slidably displaces the portion of each drop linkage positioned within the respective guide slot from the first end toward the second end thereof and pivots each pivot linkage relative to each respective side member and drop linkage.

12. The articulating step assembly according to claim 11, wherein each guide slot slopes downward from the first end to the second end.

13. The articulating step assembly according to claim 11, wherein the portion of the drop linkage slidably positioned within each guide slot comprises a pin member.

14. The articulating step assembly according to claim 11, wherein each side member further includes a base slot having a first end and a second end.

15. The articulating step assembly according to claim 14, further comprising:
an extension step, wherein the extension step is pivotally coupled to each drop linkage; and
an extension linkage associated with each side member, wherein each extension linkage includes a first end and a second end, and wherein the first end of each extension linkage is slidably positioned within the base slot of the respective side member, and the second end of each extension linkage is pivotally coupled to the extension step, whereupon articulation of the step from a retracted position to an extended position slidably directs the first end of each extension linkage from the first end of the base slot of the respective side member toward the second end of the base slot of the respective side member, thereby pivoting the second end of each extension linkage relative to the extension step.

16. The articulating step assembly according to claim 14, wherein each base slot is non-linear.

17. The articulating step assembly according to claim 16, wherein each base slot is arcuate.

18. The articulating step assembly according to claim 17, further comprising:
an extension step, wherein the extension step is pivotally coupled to each drop linkage; and
an extension linkage associated with each side member, wherein each extension linkage includes a first end and a second end, and wherein the first end of each extension linkage is slidably positioned within the base slot of the respective side member, and the second end of each extension linkage is pivotally coupled to the extension step, whereupon articulation of the step from a retracted position to an extended position slidably directs the first end of each extension linkage from the first end of the base slot of the respective side member toward the second end of the base slot of the respective side member, thereby pivoting the second end of each extension linkage relative to the extension step.

19. The articulating step assembly according to claim 15, further comprising an expansion sub-assembly, wherein the expansion sub-assembly includes a pair of brackets and an expansion step, and wherein each bracket is pivotally coupled to the extension step.

20. The articulating step assembly according to claim 19, wherein the first end of each extension linkage slidably positioned within the base slot of the respective side member comprises a pin member.

21. An articulating step assembly, comprising:
a pair of side members spaced apart from one other, wherein the side members are mountable onto the undercarriage of a vehicle, and wherein each side member includes a guide slot and a base slot; and
a step assembly comprising a step having an inverted L-shaped drop linkage at opposing ends thereof, wherein the step is associated with both of the guide slots and base slots, and a portion of each drop linkage is slidably positioned in a respective guide slot and wherein the base slots are substantially non-linear and having means connected to the step assembly, preclude inadvertent extension and/or retraction of the articulating step assembly.

* * * * *